UNITED STATES PATENT OFFICE.

ARTHUR HJALMAR BORGSTRÖM, OF HANGÖ, RUSSIA.

MANUFACTURE OF BUTTER.

No. 870,217.  Specification of Letters Patent.  Patented Nov. 5, 1907.

Application filed May 9, 1907. Serial No. 372,799.

*To all whom it may concern:*

Be it known that I, ARTHUR HJALMAR BORGSTRÖM, a subject of the Grand Duke of Finland, and a resident of Hangö, in the Grand Duchy of Finland, Russia, have invented certain new and useful Improvements in the Manufacture of Butter, of which the following is a specification.

Hitherto, in the manufacture of butter, the milk or cream has been worked at a temperature, which according to the quality of the milk or cream and surrounding circumstances has varied between 10° and 20° cent. and only exceptionally has reached a somewhat higher temperature. From ordinary milk or cream at a temperature below 9° cent. butter cannot be manufactured. At a lower temperature no formation of butter visible to the naked eye takes place, not even after the most forcible working of the longest duration. Apparently the liquid remains unchanged except that it seems to be somewhat thicker. However, the working has had a special effect, even if it is invisible. For if the cold, worked thick-liquid mass is heated to a temperature permitting the formation of butter, an almost instantaneous change takes place if the working has been sufficiently forcible. The mass "breaks" substantially as at the end of the ordinary churning operation, and the butter may be caused to separate from the churn milk by gently agitating the mass by means of a stirrer or in any other suitable manner. If the working has been very forcible or if the liquid is heated to a sufficiently high temperature, the liquid will change instantly, and without agitation, into a mass, in which the butter separated from the churn-milk can be gathered readily.

According to the above this invention consists, in the manufacturing of butter, by working the cream or milk at such a low temperature, that no visible formation of butter takes place, the liquid nevertheless being changed so that, when heated to a temperature which permits the formation of butter, such formation of butter takes place instantaneously or substantially instantaneously. During the heating operation either the liquid will "break" or finished butter and churn-milk are formed directly. In no case is the mass further treated that is to say it is not subjected to treatment that can be compared with ordinary churning. In the case first mentioned only a gentle stirring operation is necessary for causing the butter to separate. In the other case it is only necessary to gather the butter.

The working of the liquid can be effected preferably as near the freezing-point as possible without, however, permitting the liquid to freeze. However, the said operation may be effected also at a temperature below zero, if the disadvantage of adding salt to the liquid is of little importance. The temperature is never permitted to rise, during the working, to the degree, at which the formation of butter takes place, thus, for safety, not to +8° cent.

There are many advantages of the new method of manufacturing butter. Thus it may be mentioned, that the percentage of fatty substances left in the churn-milk is lower than hitherto, that overworking hardly can take place, that the consistency of the butter is more compact and the butter remains fresh for a longer period. When sweet cream is worked the same output is gained, without the troublesome "reseparating" operation of the churn-milk as at present when soured cream is churned. The method is of special importance when that class of churning apparatus is used which operates with great velocity and in which the working of the liquid is very forcible, the formation of butter at ordinary churning temperature very rapid, and consequently, the churn-milk very fatty. In effecting the working of the liquid at the low temperature, stated above, it is possible to gain, also in such apparatus, churn-milk with ordinary percentage of fatty substances. Finally it may be mentioned that this method renders it possible to effect the souring operation during the churning. As is well known it has hitherto been necessary to leave the cream for a long time, generally 18 to 20 hours, after the acid has been added, in order that the acid may "mature". If the churning operation has been effected too soon it has resulted in a too high percentage of fatty substances in the churn-milk, but if the cream, according to this method, is churned at a low temperature, the acid may be added just before or during the churning operation without any risk as to the percentage of fatty substances, and the butter may then be treated in the ordinary manner. The churn-milk will have the ordinary percentage of fatty substances and the acid will "mature" in the butter. The said souring method, practically feasible only in combination with the churning operation at a low temperature, involves, evidently, great saving of time, work, space and vessels. Also the reduced consumption of power for churning cream, to which acid has been added but which has not yet become thick is of considerable importance.

Having now described my invention, what I claim as new and desire to secure by Letters Patent is:

1. The herein described method of manufacturing butter consisting in working cream or milk at such a low temperature, that no formation of butter can take place, heating the mass to such a temperature, as permits formation of butter, and leaving the butter to separate from the milk.

2. The herein described method of manufacturing butter consisting in working cream or milk at such a low temperature, that no formation of butter can take place, heating the mass to such a temperature as permits formation of butter, and gently agitating the mass, until the butter has separated sufficiently from the same.

3. The herein described method of manufacturing butter consisting in adding acid to the cream or milk, working the cream or milk at such a low temperature, that no formation of butter can take place, heating the mass to such a temperature as permits formation of butter, and gently agitating the mass until the butter has separated sufficiently from the churn-milk.

In witness whereof, I have hereunto signed my name in the presence of two subscribing witnesses.

ARTHUR HJALMAR BORGSTRÖM.

Witnesses:
 HJALMAR ZETTERSTRÖM.
 ROBERT APELGREN.